March 10, 1931.  M. BÜTTNER  1,795,996
GEAR
Filed Nov. 11, 1929  2 Sheets-Sheet 1
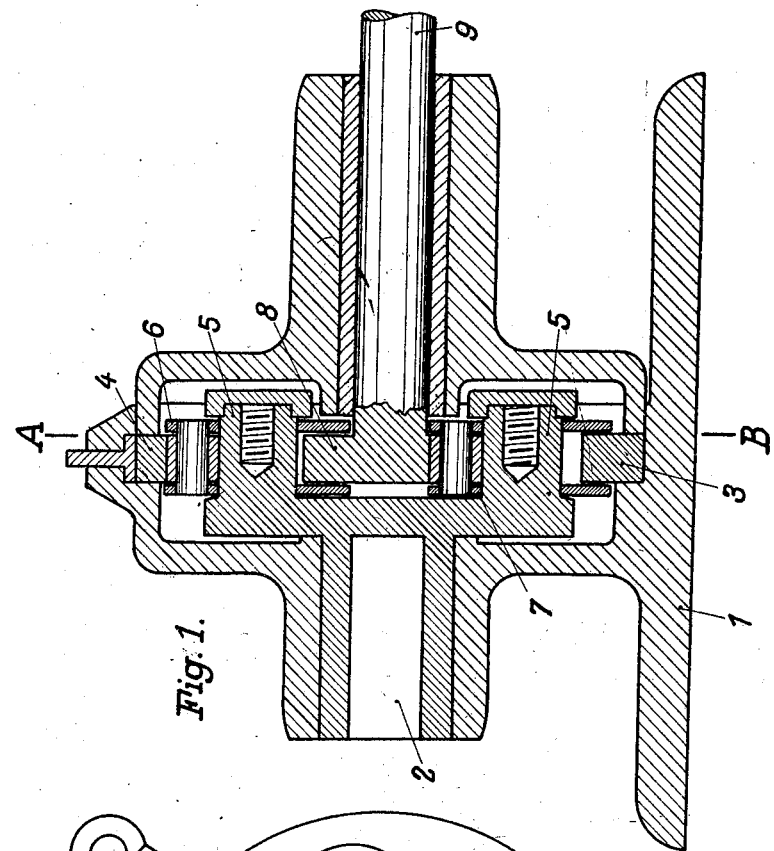
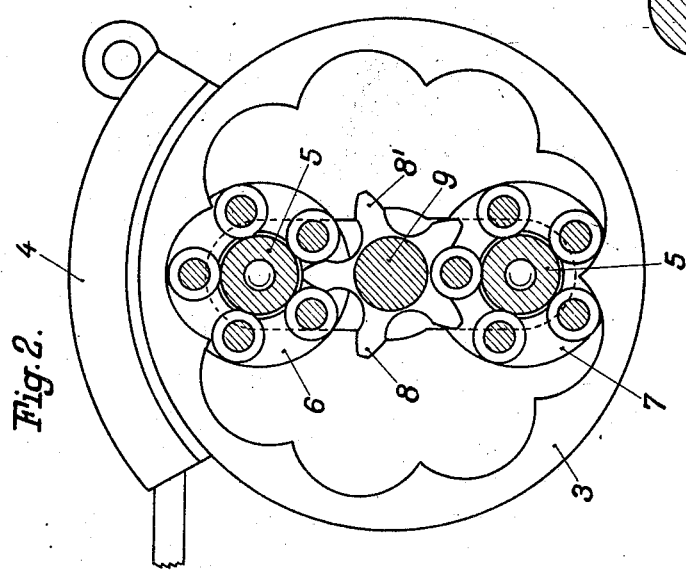
Inventor:
Max Büttner
BY
ATTORNEY March 10, 1931.                M. BÜTTNER                1,795,996
                                  GEAR
                  Filed Nov. 11, 1929        2 Sheets-Sheet 2
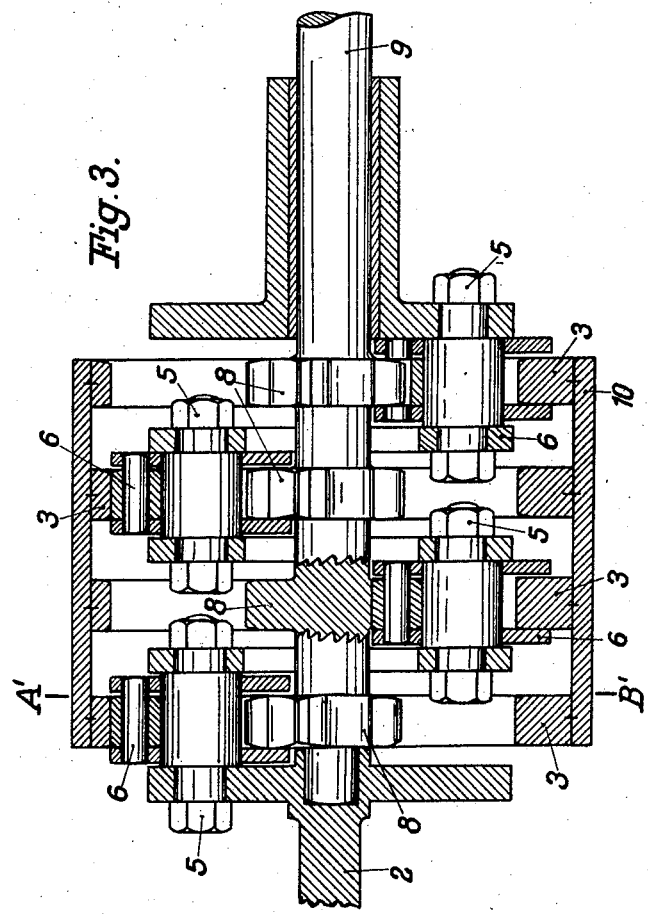
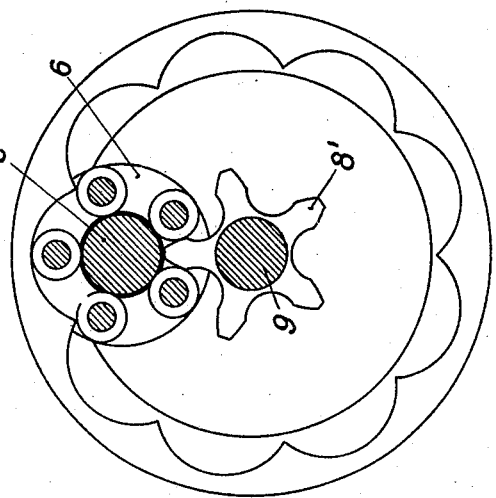
Inventor:
Max Büttner
BY
ATTORNEY Patented Mar. 10, 1931

1,795,996

UNITED STATES PATENT OFFICE

MAX BÜTTNER, OF DRESDEN-LAUBEGAST, GERMANY, ASSIGNOR TO OTTO MICHALK, OF FREITAL, NEAR DRESDEN, GERMANY

GEAR

Application filed November 11, 1929, Serial No. 406,443, and in Germany November 19, 1929.

The present invention relates to a gear. Gears of various types are known working with cog wheels or being provided with rolls which have a swinging motion and strike a curved rim to move it forward, and the feature of the invention is that a carrier or driver formed as a rim is adapted to move freely on top of a crank pin or eccentric connected with the driving member so that the rim is driven when the driving member is rotated and drives a pinion executed correspondingly and connected directly with the driven member, the rim being pressed by the pinion on to a run consisting of curves, arcs or parts thereof and prevented from free rotation, limited by the counter pressure of the driven member by being compelled to roll on the wedge-like runs. It can move freely about the eccentric only if this run cooperates in the motion in the manner desired, whereby the speed of the driven member may be regulated from idling over the direct coupling to any gearing ratio.

The arrangement can further be made so that the transmission of power from the driving shaft to the driven one takes place by means of several rims freely movable on crank shafts or eccentrics and adapted to transmit rotation to several pinions directly connected with the driven member by being guided on corresponding runs as described.

The transmission of power may be reversed also by using the driven shaft as driving one.

One form of the invention is illustrated in the accompanying drawing, in which Figure 1 is a longitudinal section of the gear; Fig. 2, a cross section in the direction A—B; Fig. 3, a longitudinal section of a gear having several rims and runs; and Fig. 4, a section on the line A'—B', of Fig. 3.

Referring to the drawing, 1 is the casing containing the driving shaft 2 and a run 3 consisting of arcs. The run can be braked by a brake 4 of any suitable type or fixed in position thereby. Connected with the shaft 2 are the crank pins 5 on which the rims 6 and 7 are rotatably disposed. Within the rims a pinion 8 is positioned which is firmly connected with the driven shaft 9 and whose teeth 8' cooperate with the rolls of the rims 6 and 7.

The device functions as follows:

During the rotation of the driving shaft 2 the crank pins 5 and thus the roll systems 6 and 7 are caught and driven. As the rim engages the pinion at this motion, it will turn about the pinion and also about the center of the crank pin or eccentric. Owing to the run being struck by the roll, free rotation of the rim about its axis is prevented when the run 3 is held by the brake 4.

If the brake 4 is released slowly, the run 3 moves slowly, too, and the driven speed is reduced until finally, when the run 3 cooperates fully in the motion, no speed is transmitted any more and idling is effected. At any intermediate stage between maximum speed and idling the ratio of gearing will be 1/1. If the rotation of the run is increased in the same direction, the driven member will move back. However, contrary to the fixed gearing ratio chosen, one may increase it still more if the run is driven from idling opposite to the direction of rotation of its cooperating element.

In Figs. 3 and 4 several carriers 6, 7 are connected with the driving shaft 2 over the crank pins 5 of a crank consisting of several parts. The driven shaft 9 carries several pinions 8, and a plurality of runs 3 is provided which are interconnected by a common cylinder 10. The mode of operation is the same as described with reference to Figs. 1 and 2. The brake acts here on the cylinder 10, and the positive prevention of the free rotation of the rims 6, 7 takes place by means of the curve rim 3 which serves as guide for the roll and prevents free movement on the part of the rims 6 and 7. If no curve rim were provided, the roll rims would rotate freely without transmitting power.

As the rotation of the rims 3 changes also the angle of the curves, the torque of the driven shaft is increased at decreasing speed. According to the principle of the inclined plane viz. that the smaller the angle of inclination the greater the load is that can be lifted, the increase of the torque of the driven member is effected.

I claim:—

Gear comprising in combination a driving member with a crank pin, a carrier on the said crank pin, the said carrier being formed as a roll system, a driven member with a sun gear formed as a sprocket wheel, and a run for the said carrier capable of being braked and formed as a curved track, the said roll system being pressed by the said sprocket wheel against the said curved track to transmit the driving speed and driving power at any ratio over the direct coupling to the said driven member.

In testimony whereof I affix my signature.

MAX BÜTTNER.